US005238141A

United States Patent [19]

Callegari et al.

[11] Patent Number: 5,238,141

[45] Date of Patent: Aug. 24, 1993

[54] L.P. TANK LOCKING COVER

[76] Inventors: Peter C. Callegari, 18 Cambridge Ave., Bethpage, N.Y. 11714; Joseph A. Gobos, 297 Merrick Rd. Apt #3C, Amityville, N.Y. 11701

[21] Appl. No.: 941,714

[22] Filed: Sep. 8, 1992

[51] Int. Cl.[5] ........................ B65D 55/14; F16K 35/10

[52] U.S. Cl. .................................... 220/725; 220/724; 220/728; 220/210; 220/259; 220/DIG. 20; 137/382; 137/383

[58] Field of Search ............... 220/725, 724, 727, 726, 220/728, 210, 259, DIG. 20; 137/382, 383

[56] References Cited

U.S. PATENT DOCUMENTS

| | | | |
|---|---|---|---|
| 3,185,336 | 5/1965 | Goss | 220/725 |
| 3,264,850 | 8/1966 | Bower | 220/259 X |
| 3,394,836 | 7/1968 | Millard | 220/210 |
| 3,476,288 | 11/1969 | Sherrill | 220/725 |
| 4,030,628 | 6/1977 | Hippert, Jr. | 220/259 X |
| 4,254,888 | 3/1981 | Chandler | 220/259 X |
| 4,457,445 | 7/1984 | Hanks et al. | 220/214 |
| 4,513,773 | 4/1985 | Hardiman, Jr. | 137/382 |
| 4,613,055 | 9/1986 | Connors | 220/210 |
| 5,092,359 | 3/1992 | Wirth et al. | 137/382 |

*Primary Examiner*—Allan N. Shoap
*Assistant Examiner*—Vanessa Caretto
*Attorney, Agent, or Firm*—Leon Gilden

[57] ABSTRACT

A cover includes a base plate having a radial slot directed into the base plate medially thereof to receive a handle stem of a handle of a conventional L.P. tank valve assembly. The base plate includes a cover cap hingedly mounted to the base plate diametrically aligned relative to the slot, with the base plate and cover cap including cooperating flanges and cooperating apertures within the flanges to receive a lock member simultaneously through the flanges to secure the cover cap in an overlying contiguous communication to the base plate to prevent access to the valve handle preventing unauthorized rotation of the valve handle.

4 Claims, 4 Drawing Sheets

FIG 7
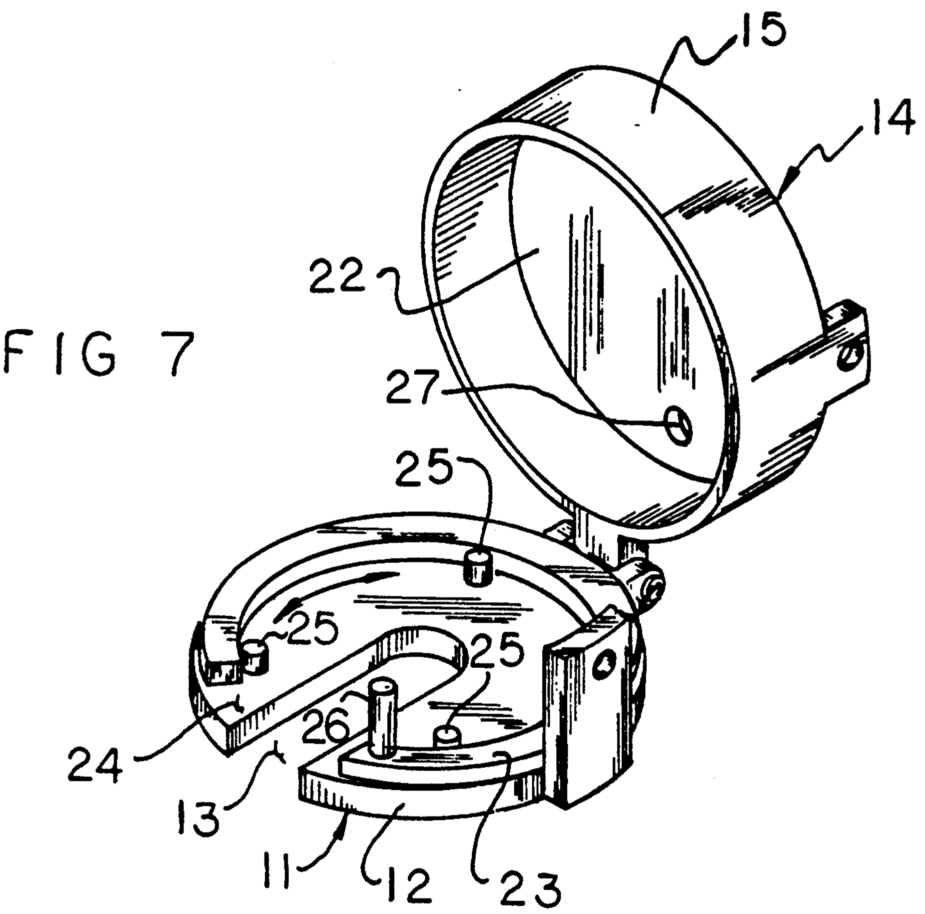
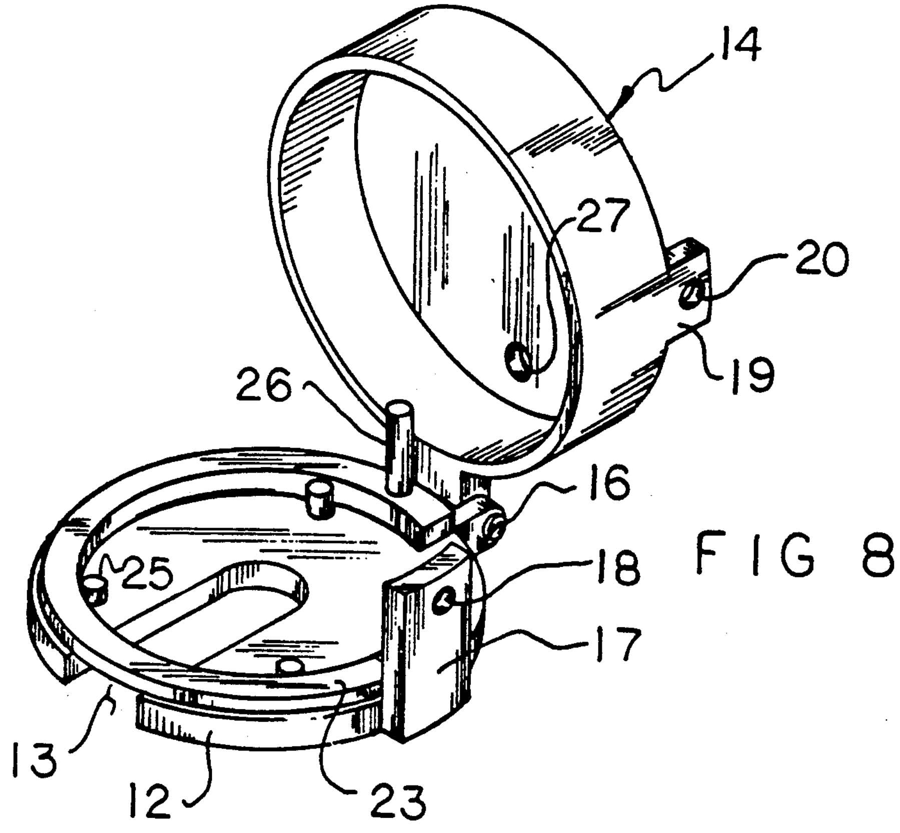
FIG 8

L.P. TANK LOCKING COVER

BACKGROUND OF THE INVENTION

1. Field of the Invention

The field of invention relates to pressurized cylinder locking cap structure, and more particularly pertains to a new and improved L.P. tank locking cover wherein the same is arranged to receive a handle valve on an associated pressurized tank handle therewithin preventing unauthorized rotation of the handle to open the valve relative to an associated gas cylinder.

2. Description of the Prior Art

Commercially available pressurized gas tanks, and typically those utilized to contain liquid petroleum (referred throughout the specification as L.P.) gas for various applications such as heating, cooking, and the like, are provided with handles rotatably mounted relative to an underlying valve structure. To prevent unauthorized tampering of the handle and unauthorized opening of the valve structure relative to the pressurized tank, the instant invention attempts to address deficiencies of the prior art by providing for a locking cover and base plate structure to receive the handle therewithin providing access to the handle for its rotation. The prior art has heretofore failed to provide for an organization of compact construction as set forth by the instant invention addressing both the problems of ease of use as well as effectiveness in construction and in this respect, the present invention substantially fulfills this need.

The U.S. Pat. No. 4,648,526 to Wood sets forth a prior art gas cylinder cap rotatably mounted overlying a pressurized cylinder to provide and afford protection to a valve contained within the dome-shaped housing.

The U.S. Pat. No. 5,004,117 to Kitsuda sets forth a gas cylinder cap arranged for mounting to a threaded base to afford protection to a valve contained therewithin.

SUMMARY OF THE INVENTION

In view of the foregoing disadvantages inherent in the known types of pressurized tank locking cover structure now present in the prior art, the present invention provides an L.P. tank locking cover wherein the same is arranged to receive and afford protection to a valve handle relative to an associated tank valve. As such, the general purpose of the present invention, which will be described subsequently in greater detail, is to provide a new and improved L.P. tank locking cover which has all the advantages of the prior art L.P. tank valve cover structure and none of the disadvantages.

To attain this, the present invention provides a cover including a base plate having a radial slot directed into the base plate medially thereof to receive a handle stem of a handle of a conventional L.P. tank valve assembly. The base plate includes a cover cap hingedly mounted to the base plate diametrically aligned relative to the slot, with the base plate and cover cap including cooperating flanges and cooperating apertures within the flanges to receive a lock member simultaneously through the flanges to secure the cover cap in an overlying contiguous communication to the base plate to prevent access to the valve handle preventing unauthorized rotation of the valve handle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved L.P. tank locking cover which has all the advantages of the prior art L.P. tank locking cover apparatus and none of the disadvantages.

It is another object of the present invention to provide a new and improved L.P. tank locking cover which may be easily and efficiently manufactured and marketed.

It is a further object of the present invention to provide a new and improved L.P. tank locking cover which is of a durable and reliable construction.

An even further object of the present invention is to provide a new and improved L.P. tank locking cover which is susceptible of a low cost of manufacture with regard to both materials and labor, and which accordingly is then susceptible of low prices of sale to the consuming public, thereby making such L.P. tank locking covers economically available to the buying public.

Still yet another object of the present invention is to provide a new and improved L.P. tank locking cover which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the invention incorporating lock ring structure.

FIG. 8 is an isometric illustration of the lock ring structure in operative orientation relative to the base plate of the invention.

DESCRIPTION OF THE PREFERRED EMBODIMENT

Figure 1:
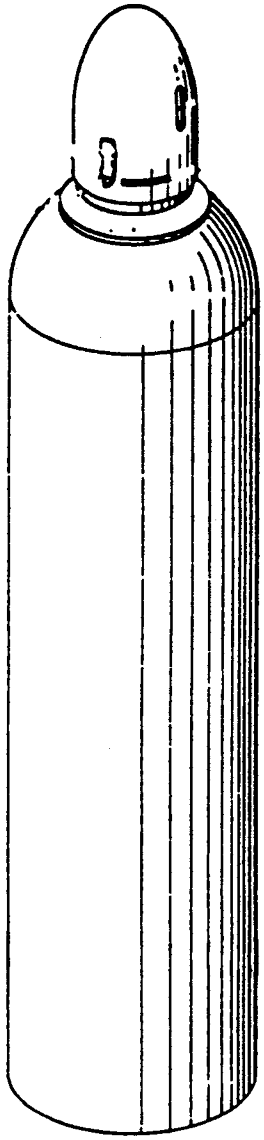
FIG 1 PRIOR ART
FIG. 1 is an isometric illustration of a prior art cover cap for a pressurized cylinder, as set forth in U.S. Pat. No. 4,648,526.
Figure 2:
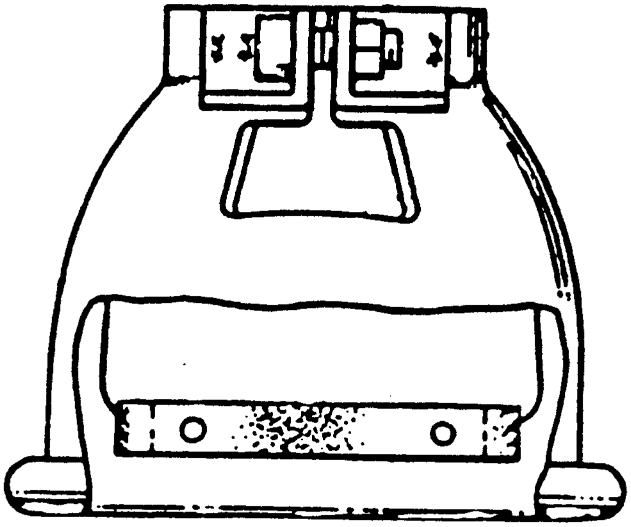
FIG 2 PRIOR ART
FIG. 2 is an orthographic side view of a further example of a prior art safety cylinder cap structure, as set forth in U.S. Pat. No. 5,004,117.
Figure 3:
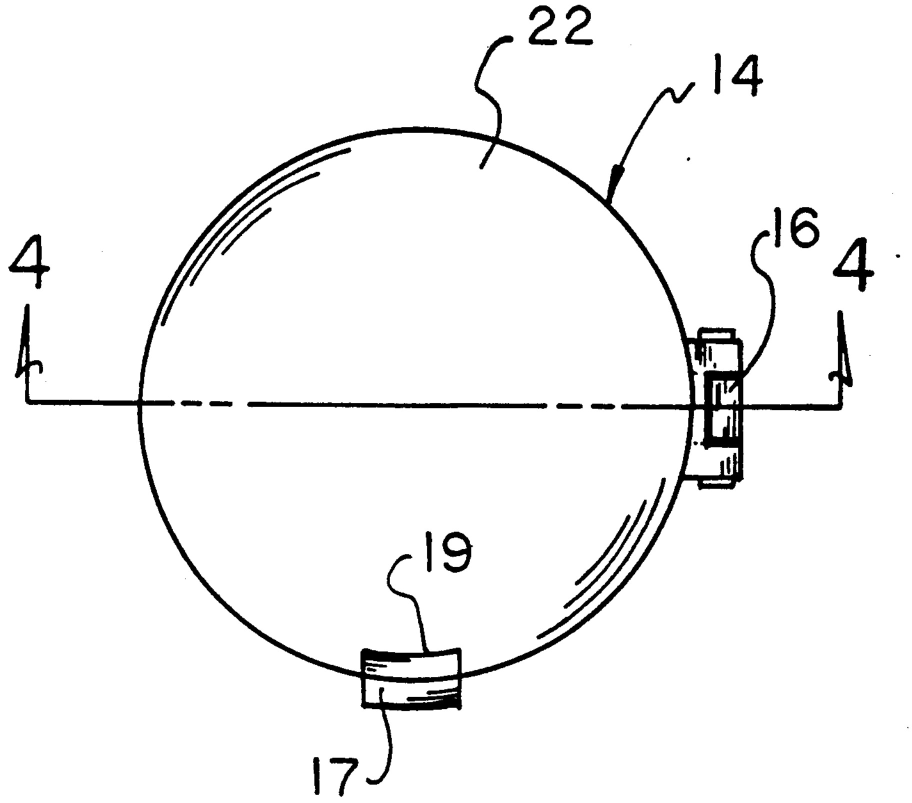
FIG. 3 is an orthographic top view of the instant invention.

With reference now to the drawings, and in particular to FIGS. 1 to 8 thereof. a new and improved L.P. tank locking cover embodying the principles and concepts of the present invention and generally designated by the reference numeral 10 will be described.

Figure 4:
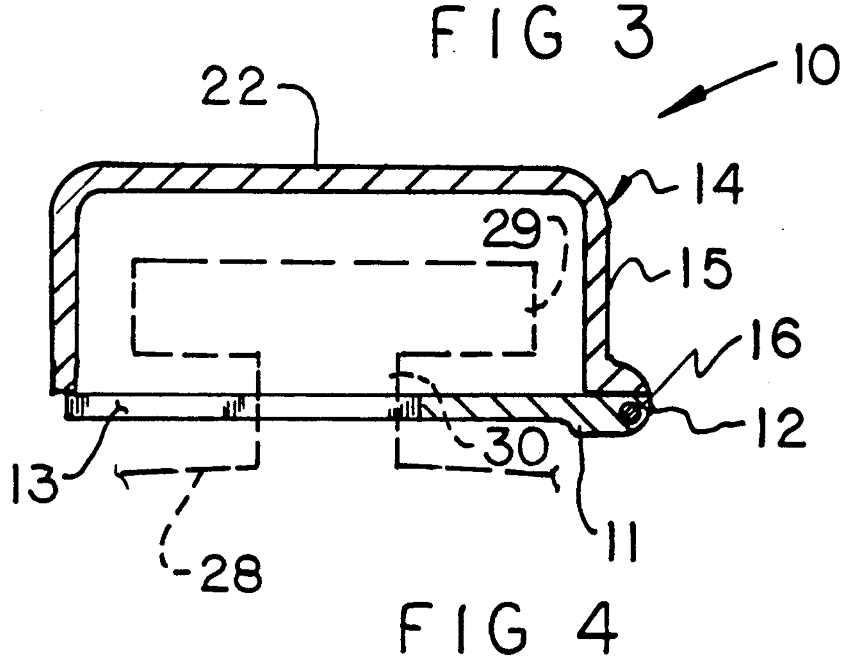
FIG. 4 is an orthographic view, taken along the lines 4—4 of FIG. 3 in the direction indicated by the arrows.
Figure 6:
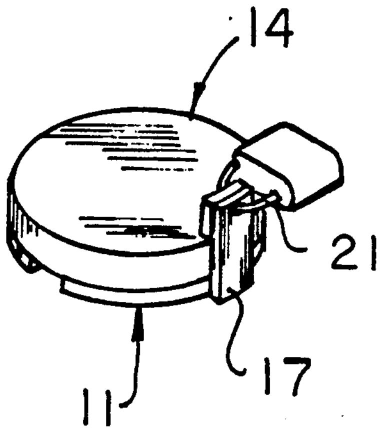
FIG. 6 is an isometric illustration of the invention indicating the use of a lock member therewith.
Figure 5:
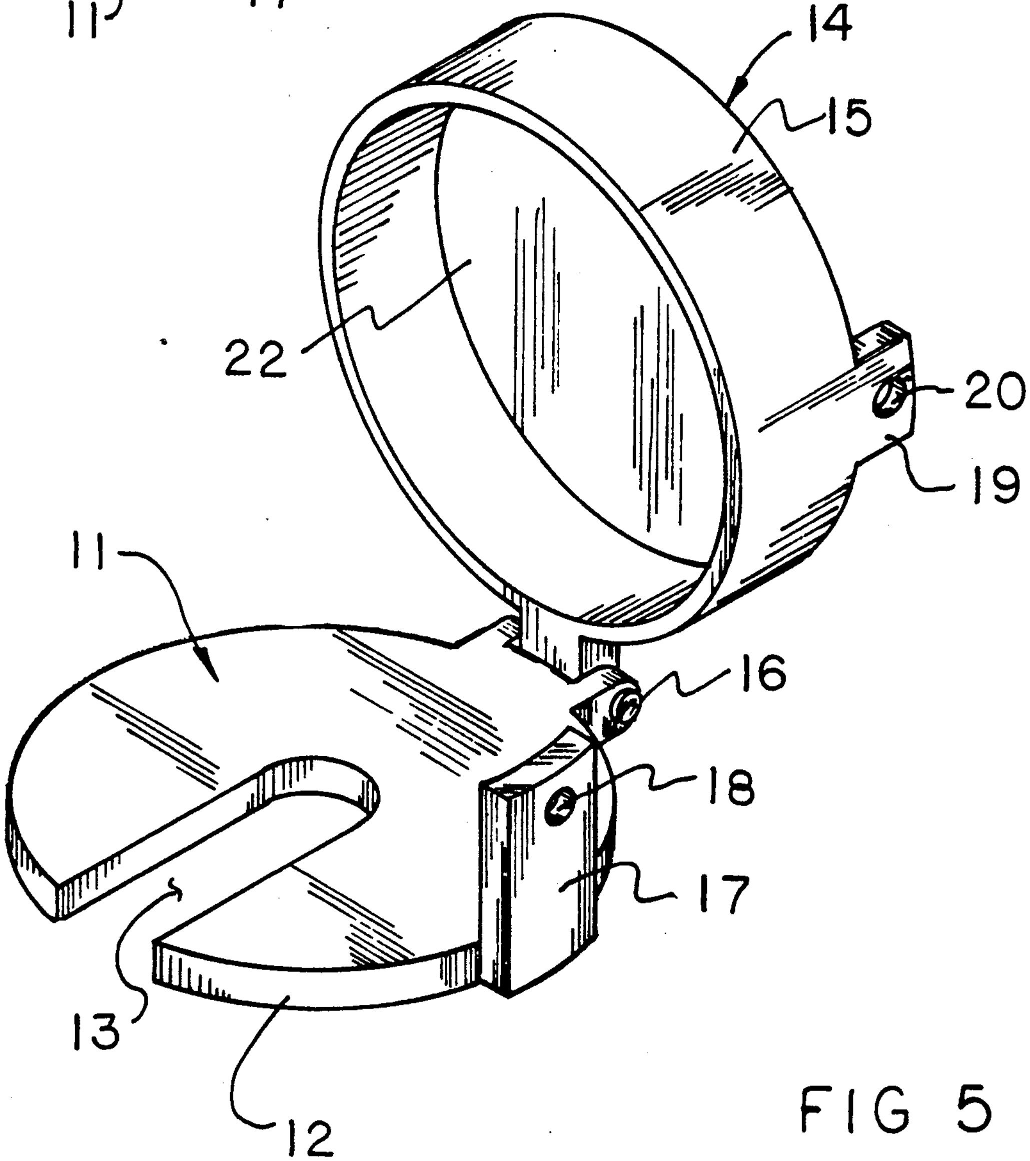
FIG. 5 is an isometric illustration of the invention.

More specifically, the L. P. (liquid petroleum) tank locking cover 10 of the instant invention essentially comprises a generally planar base plate 11 having a base plate annular periphery 12. A slot 13 extends from the periphery 12 to an orientation to receive the medial central portion of the base plate 11 to accommodate a handle stem 30 of an associated handle 29 of an associated tank valve 28, in a manner as indicated in FIG. 4. A cover cap 14 is provided to overlie the base plate 11, with the cover cap having an annular side wall 15 of a predetermined first height having a cover cap top wall 22. A hinge 16 is provided and mounted to the cover cap side wall and the base plate in an orientation diametrically aligned with the slot 13. A base plate lock flange 17 of a second height greater than the first height is orthogonally mounted to the periphery 12 of the base plate 11. The base plate lock flange 17 includes a base plate lock flange aperture 18. The cover cap includes a cover cap flange 19 having a cover cap flange aperture 20 that extends above the cover cap top wall 22. When in a first position with the cover cap in contiguous communication with the base plate, the apertures 18 and 20 are aligned to receive a lock member bar 21 (see FIG. 6) therethrough to secure the cover cap to the base plate in a first position. In a second position, the cover cap is pivoted to space the cover cap flange aperture 20 relative to the base plate lock flange aperture 18, in a manner as indicated in FIG. 5.

The FIGS. 7 and 8 indicate the use of a discontinuous lock ring 23 in cooperation with the organization, wherein the lock ring 23 is slidably mounted to a top surface of the base plate 11. The discontinuous lock ring 23 includes a lock ring gap 24 that is aligned with and positioned over the slot 13 in the second position, as indicated in FIG. 7, with the lock ring gap 24 displaced and positioned over the top surface of the base plate 11 when the cap 14 is to be mounted to the base plate in the first position.

The base plate 11 includes an annular array of positioning rods 25 mounted orthogonally to the top surface of the base plate in an integral relationship, and arranged to position the lock ring 23 between the positioning rods 25 and the periphery 12. The lock ring 23 includes a lock ring alignment bar 26 fixedly and orthogonally mounted to a top surface of the lock ring positioned adjacent the gap 24. The cover cap top wall 22 includes a cover cap top wall aperture 27 positioned in adjacency relative to the hinge 16 and arranged to receive the alignment bar 26 in the first position of the cover structure. In this manner, the lock ring 23 further prevents access to a handle positioned within the cover structure, wherein children and the like are thereby limited access relative to the handle, with the lock ring acting as a barrier to such access.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variation in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A tank locking cover, comprising, a planar base plate, the planar base plate including a peripheral side wall, and a slot extending from the peripheral side wall to an orientation medially of the base plate, and a cover cap, the cover cap including a cover cap side wall defined by a predetermined first height, and a hinge mounted to the cover cap side wall and the peripheral side wall diametrically aligned with the slot, and lock means mounted to the peripheral side wall and the cover cap for securement of the cover cap relative to the base plate, and the cover cap includes a cover cap top wall, and a base plate lock flange fixedly and orthogonally mounted to the peripheral side wall having a predetermined second height greater than the first height, and integrally mounted to the peripheral side wall, and the base plate lock flange includes a base plate lock flange aperture, and the cover cap top wall includes a cover cap flange fixedly and integrally mounted to the cover cap top wall, wherein the cover cap flange includes a cover cap flange aperture, and the cover cap flange and the base plate lock flange are in contiguous communication relative to one another when the cover cap is in contiguous communication with the base plate in a first position, and the cover cap flange is displaced relative to the base plate lock flange in a second position when the cover cap is pivoted relative to the base plate in a spaced relationship, and the cover cap flange aperture and the base plate lock flange aperture are coaxially aligned in the first position, and a lock member, the lock member directed through the cover cap flange aperture and the base plate lock flange aperture in the first position.

2. A locking cover as set forth in claim 1 including a discontinuous lock ring slidably mounted to the base plate between the base plate and the cover cap, and the lock ring includes a lock ring gap aligned with and overlying the slot in the second position, and wherein the gap is displaced relative to the slot in the first position.

3. A locking cover as set forth in claim 2 including an annular array of positioning rods mounted to the base plate, with the lock ring positioned between the positioning rods and the peripheral side wall, and a lock ring alignment bar fixedly and orthogonally mounted to the lock ring orthogonally oriented relative to the base plate having a further height greater than said first height, and the cover cap top wall includes a cover cap top wall aperture receiving the lock ring alignment bar in the first position.

4. A locking cover as set forth in claim 3 wherein the lock ring alignment bar is positioned in adjacency to the gap on the lock ring.

* * * * *